Patented May 25, 1926.  1,585,827

UNITED STATES PATENT OFFICE.

ANSON G. BETTS, OF KINDERHOOK, NEW YORK.

REFRACTORY AND CERAMIC PROCESS AND MATERIAL.

No Drawing.  Application filed March 12, 1923. Serial No. 624,386.

This process relates to the use of water-soluble compounds in the ceramic or refractory mixture to be converted into solid material.

Some of the objects of this invention are to increase the strength of the formed bodies before firing, to increase the refractibility and purity, to improve color, widen the scope of refractory and ceramic manufacture, lower manufacturing costs. Other objects will appear in the following description of my method.

In the ordinary manufacture, in which clay is used in whole or in part, the formed or molded articles can be dried and then fired but limitations are placed in the way of manufacture by deficiencies in the properties of the dried articles in the way of fragility, shrinkage in drying and firing, over-burning and under-burning: no purification from unwelcome natural impurities in the materials, tending to lower refractibility or undesirable color, is provided for or effected: the final strength is developed by a partial melting of the body itself.

In my improved method, I use instead of water, preferably a solution of basic aluminum chloride. These solutions may have the composition as given by the formulas Al (OH) Cl$_2$ and Al (OH)$_2$Cl or be intermediate or more acid or basic according to specific requirements. After forming the mix into shapes or articles, they are preferably dried which takes place readily producing rather hard bodies, considerably harder than when water is used, facilitating handling, placing in kilns, permitting the manufacture of more intricate and difficult shapes. and securing other advantages. If the wet mix is to be applied to furnace work as a cement, it can be applied wet, and takes a sufficiently firm and hard set on drying, for such purposes. It might be noted that damp and cold atmospheres cause the articles to reabsorb aqueous vapors and undo the drying effect.

I have found that strongly basic aluminum chloride solution has peculiar and important advantages as a bonding agent for refractory and ceramic raw mixes, to wit: Basic aluminum chloride solution has non-crystallizing and apparently colloidal properties and appears to be, or to be equivalent to, a colloidal solution of aluminum hydrate and to constitute a stable solution and for some applications has the further advantage of having the properties of a reversible colloid, in that its solution dries down to a gummy mass which is resoluble in water producing a solution like the original. It has the further advantage in this invention, over crystalline salts and "water glass" or sodium silicate solution considerably used as a refractory bonding agent, or what may be called "non-migration during drying" of a formed refractory or ceramic article, in that during such drying the basic aluminum chloride remains dispersed through the body and with little or no formation of surface crusts, caused in the case of crystalline salts and "water glass" by the solution during drying moving to the surface for drying and there depositing its load of dissolved salt. These crusts are very objectionable for many reasons but I have been able to avoid them by my invention. Ordinary aluminum chloride, which is hydrated AlCl$_3$ is a crystalline salt and very much less desirable than strongly basic aluminum chloride, both for the foregoing reasons, for the further reason that the salt is very hygroscopic and retains water so persistently that it is impracticable to mold an article and dry it to a solid hard shape by ordinary refractory and ceramic drying arrangements. It is further highly acid in its action on metals, resembling hydrochloric acid in that respect, and objectionable to work with from its corrosive and disagreeable properties, which properties are not shared by strongly basic aluminum chloride, which is almost without action on metals, hands or clothing. On drying and heating the article, there is much less hydrochloric acid to be driven off and probably wasted, or collected at considerable expense, while in the basic chloride, there is still sufficient latent acid vapor to have all useful effects in removing iron, and further such acid vapor is only driven off at a higher temperature where it is more effective. A refractory article or ceramic article bonded with basic aluminum chloride solution dries out nicely in the ordinary process and produces a much harder and tougher raw shape for handling and burning, than may be obtained in the usual clay-bonding method, and considerable other advantages are thereby obtained. A further advantage of the basic chloride solution, over the ordinary chloride, is that solution may be used containing considerably greater percentages of actual alumina, than is contained in a saturated solution of aluminum trichloride. This advantage obtains where it is desired to incorporate in solution the maximum amount of alumina, for maximum density and maximum percentage of alumina.

On heating such masses bonded with basic aluminum chloride, bodies, shapes or articles, water vapor and hydrochloric acid gas are expelled, but the expulsion of the hydrochloric acid is a lingering one and evolution of acid and ferric chloride vapors continues up to and perhaps beyond a strong red heat. If the heating is carried out in a stream of hot gas containing free oxygen, and particularly with small or thin shapes, the volatilizing effect on ferric or ferrous oxide is less or absent, the chlorine in that case probably being evolved as chlorine instead of hydrochloric acid, HCl. With large bodies, iron chlorides can be volatilized in the interior, where there is little or no penetration of oxygen, and at the surface under the influence of oxygen, cause decomposition into chlorine, with deposition of iron. If one of the surfaces of a body is too cool relatively to other parts, there may even be a deposition of sublimed ferric chloride crystals and the formation of an irony dark-color layer or band at such a surface. By control of the atmosphere in which heating is done, with reference to reducing or oxidizing conditions, or heating in muffles or saggars, electric furnaces in protected atmosphere, good results with reference to removal of iron by volatilization, may be secured. Needless to say, the removal of iron from refractory or ceramic wares is advantageous with respect to color and refractoriness. Iron-free articles or articles very low in iron may at present be made from iron-free materials, but such materials are very scarce or expensive. By my method I may use materials of comparatively low-grade with reference to iron content, and cheaper and more abundant materials, or if increased plasticity, and get superior results.

The volatilizing effect is not confined to iron but there is more or less volatilization of other metallic elements having fluxing properties. Copper, for example, if present, will be volatilized provided not prevented by too strong reducing conditions. Probably there is also some removal of alkaline metals and titania under conditions favorable thereto, with respect to temperature and atmosphere. Titania should volatilize at titanium, chloride, when no free oxygen is present, but the heats of formation of titanium oxide and titanium choride would indicate that there would be no volatilization of titania except under neutral, or better, reducing conditions.

I may also improve the refractoriness of earths, clay, and other mineral raw materials by treatment in bulk with aluminum chloride or basic aluminum chloride. For example, I may take the mineral kyanite containing copper for example, moisten the crushed or powdered rock with the desired solution and heat in a reverberatory, muffle or other furnace to a temperature of around 2500 degrees Fahrenheit causing the conversion of the kyanite to sillimanite and removing any copper as volatilized copper chloride, which of course can be saved in well-known ways of treating furnace gases and smoke. Clays, bauxites and so forth, treated in the same way, have the percentage of alumina increased and that of iron diminished simultaneously, and can be incidentally shrunk into dense refactory base material. I may also apply aluminum choride and basic aluminum chloride to the treatment of ores for the recovery of valuable constituents, as copper, silver, lead and zinc. To do this the ores, slags and so forth, are furnaced with preferably basic aluminum chloride, when the metal chlorides are driven off on sufficiently heating, attention being given to the most favorable conditions with respect to oxidizing neutral or reducing atmosphere with respect to the particular ore and is contents in metal, under treatment. The metals of course can be recovered by well-known methods of gas and fume treatment.

In ceramic manufacture at present, the pores are originally filled with water in the mixture and when dried, corresponding empty spaces are left. By the use of my method, these pores become partly filled with aluminous material, which means an increased density and lower shrinkage on vitrifying, as well as increased refractibility. By the use of my method, and the harder and stronger dried article thereby secured before strongly heating, the scope of ceramic manufacture is extended in the direction of the production of more accurate difficult and artistic products. The results possible with regard to color or whiteness by incidental removal of iron are also important.

In my method of making ceramic and refractory objects the heating may be done in molds of suitable material so that it is possible thereby to cast plastic mixes and then heat molds and contents, producing articles, finished or partly finished by purely mechanical operations.

In the claims the term dryable refers to the property of drying in the warm air of a refractory drying floor.

In the claims I have used the word ceramic-refractory as descriptive of the materials treated of herein. The word ceramic might be held to apply only to earthenware or porcelain, and the term refractory in many of its usages is too broad although as applied to materials it is becoming definitely to apply to fire-brick and the like.

In the claims the term "protected atmosphere" is used with reference to atmosphere surrounding material under treatment controlled as to oxidizing-reducing effects, as distinguished from kiln atmosphere in which the gases from the fire circulate freely about the material being burned.

What I claim as new and desire to secure by Letters Patent, is—

1. Refractory-ceramic mix consisting of refractory comminuted acid-insoluble material wetted with a solution containing basic aluminum halide.

2. Ceramic-refractory mix consisting of inorganic refractory acid-insoluble base material wetted with a solution containing basic aluminum chloride.

3. Ceramic-refractory mix consisting of an acid-insoluble silicate base material wetted with a solution containing basic aluminum chloride.

4. Process of volatilizing a metallic-compound ingredient of mineral matter which consists in bringing together therewith water and basic aluminum chloride, heating, driving off water, and by further heating volatilizing a metallic chloride other than aluminum chloride.

5. Process of volatilizing iron from ceramic-refractory material which consists in bringing together therewith solution of basic aluminum chloride, drying, heating and volatilizing ferric chloride.

6. Process of volatilizing iron from ceramic-refractory material which consists in bringing together therewith solution of basic aluminum chloride, drying, heating in a protected atmosphere, and volatilizing ferric chloride.

7. Process of making ceramic-refractory article which consists in forming wet with basic dryable aluminum halide salt, drying to a relatively hard body and further heating.

8. Process of making ceramic-refractory article which consists in shaping wet with basic aluminum chloride, drying to a relative hard body and further heating.

9. Process of making ceramic-refractory article which consists in shaping with basic aluminum chloride solution, drying to a relatively hard article, further heating and volatilizing therefrom iron chloride.

In testimony whereof I have hereunto signed my name.

ANSON G. BETTS.